Jan. 9, 1968     O. TSCHUDIN     3,362,764

BEARING CONSTRUCTION

Filed April 21, 1966     2 Sheets-Sheet 1

INVENTOR
OSWALD TSCHUDIN

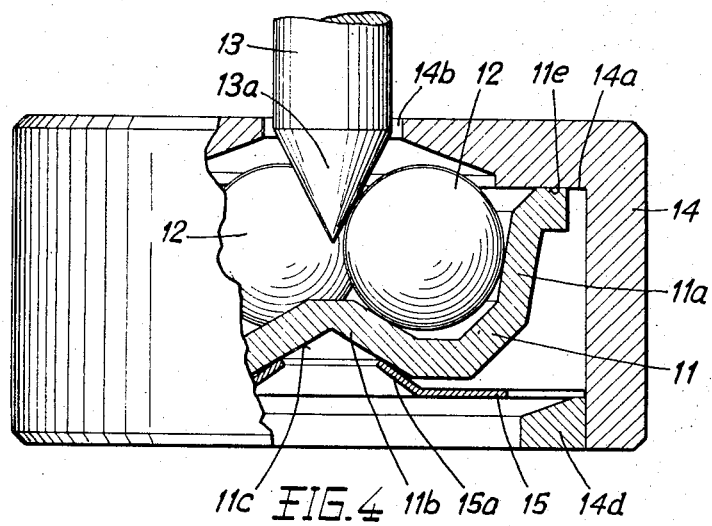
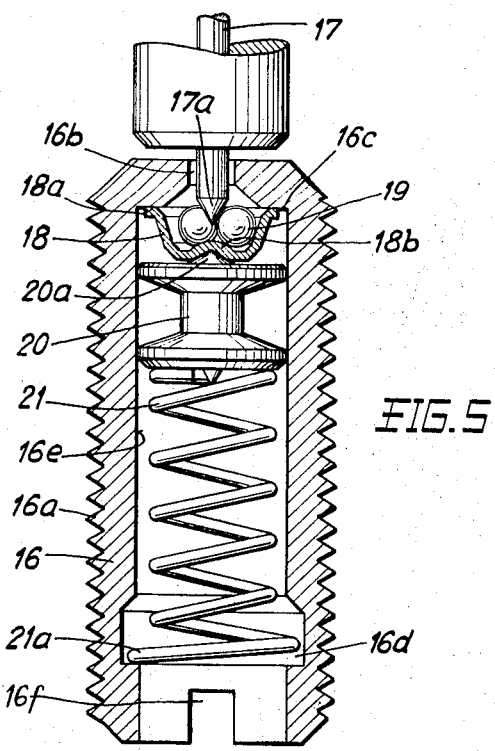

United States Patent Office 3,362,764
Patented Jan. 9, 1968

3,362,764
BEARING CONSTRUCTION
Oswald Tschudin, Waldenburg, Switzerland, assignor to Institut Dr. Ing. Reinhard Straumann AG, Waldenburg, Switzerland
Filed Apr. 21, 1966, Ser. No. 544,297
Claims priority, application Switzerland, Apr. 23, 1965, 5,704/65
8 Claims. (Cl. 308—230)

This invention relates, in general, to a bearing construction and, in particular, to a new and useful bearing construction particularly for the support of small shafts which includes a substantially dish-shaped ball race containing at least three balls which centrally support a tapered shaft member and to improved means for centering the race and the ball bearings in a manner permitting adjustment for axial and radial thrust.

The present invention deals with the construction of a bearing which includes a dish-shaped bearing race which normally is contained within a bearing box and which contains a plurality of balls which rotate within the race and which support a shaft centrally therebetween. Ball bearings of this general type are disclosed and claimed in U.S. Patent No. 2,622,948. The present invention is an improvement over that disclosed in the patent particularly in respect to the means for centering the ball race and for permitting it to be moved in the event of axial and radial thrust.

The arrangement is such that the bearing surfaces will permit the race carrying the balls to yield axially when subjected to an axial thrust of predetermined amount and also to yield radially when subjected to a radial thrust beyond a predetermined amount. Biasing means for centering the ball race ensure that it is returned to a normal position when the unbalancing thrust is removed.

In accordance with the invention there is provided a bearing box member which is provided with an interior hollow portion in which is mounted a dish-shaped race member which receives at least three balls which move around between a central projection and an outer rim wall thereof. The bearing box is provided with an opening for receiving the shaft which is to be rotatably supported. The shaft is provided with a conically tapered end to permit it to be held centrally within the three balls of the race member. In accordance with a feature of the construction, the race member is provided with an oblique centering surface which may comprise either a surface defined on the rim wall which cooperates with an annular centering rim of the bearing box, or a central surface defined in a central projection of the race member which cooperates with a dish-shaped spring or its equivalent.

An advantage of the construction of the bearing of the present case is that it can be produced and sold as a self-contained assembly in which the radial forces are not transmitted to the ball race during fitting so that there will be no distortion of any sensitive parts of the bearing. A bearing of the invention can be fitted in any position for the reception of the bottom or top end of a shaft or the bearing may be oriented in a proper position for receiving a shaft disposed at any angle from the vertical if desired.

Accordingly, it is an object of the invention to provide an improved bearing construction which includes a ball race having at least three balls therein for centering and supporting a tapered end of a shaft and with means provided for permitting movement of the ball race when the shaft is subjected to either axial or radial overloads which permits the ball member to be moved backwardly into a properly oriented position after the overloads are removed.

A further object of the invention is to provide a self-contained bearing unit which may be installed in a stationary journal part in a position ready to receive a shaft which may be thereafter inserted.

A further object of the invention is to provide a bearing which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 4 is a view similar to FIG. 1 of another embodiment of the invention; and

FIG. 5 is an axial sectional view of a further embodiment of the invention.

Figure 1:
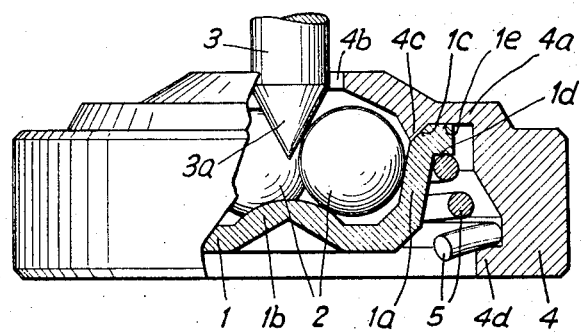
FIG. 1 is a partial elevational and partial transverse sectional view of a bearing constructed in accordance with the invention.

Referring to the drawings, the miniature ball-bearing illustrated in FIG. 1 comprises a ball race 1 formed by a single, generally dish-shaped sheet metal member. This ball race carries three balls 2 of which only two can be seen in the drawing. The shaft 3 has a tapering cone-shaped end 3a which rests on the three balls 2. The balls make contact with the ball race 1 at two points, one such point being situated on an outer rim 1a and the other such point being situated on a projection 1b disposed centrally on the floor of the race. This may be of cone shape or similar suitable configuration but naturally it should be concentric with the peripheral rim 1a. The dimensions of the several parts are such that, when the shaft 3 revolves, the balls will roll in contact with the ball race 1 at the specified points and with the conical surface 3a of the shaft 3.

The bearing also comprises an outer cup-shaped bearing box 4 with a central opening 4b in the floor portion 4a for the entry therethrough of the end of the shaft 3. The bearing can be used in any desired attitude but the portion 4a containing the opening 4b is here referred to as the floor, although in the drawing it appears at the top. The inside surface of the floor portion of the bearing box 4 described is formed with an annular centering rib 4c which cooperates with a chamfer or centering surface 1c on the inside of the rim of the ball race for keeping the latter in central alignment. A conical coil spring 5 bears against the underside 1d of a lip on the ball race 1 and is supported by a ledge 4d inside the bearing box 4, thereby urging a flat edge 1e of the rim of the ball race 1 against the inside of the floor 4a of the cup-shaped bearing box 4.

The rating and loading of the spring 5 are so calculated that an axial thrust of the shaft 3 will displace the ball race 1 axially and a radial thrust of the shaft will displace it radially, in the latter instance the cooperation of the centering surface 1c with the centering rib 4c causing the ball race to tilt because only part of the circumference of the centering surface 1c will actually shift by sliding over the flank of the rib towards its crest. As the angle of this conical surface 1c corresponds to the direction of a thrust having substantially equal radial and axial directional components, it is practically impossible for the bearing to sustain damage, unlike known tiltable bearings in which the tilt is in the opposite direction. The disposition of the centering rib 4c and the centering surface 1c described also ensures that as soon as the radial thrust ceases to be exerted the ball race will be returned by the pressure of spring 5 and the consequent pressure of the centering surface 1c against the centering rib 4c into the normal position which the race is shown occupying the drawing. Moreover, in order to avoid any possibility of the shaft end 3a and of the balls 2 and the ball race 1 being damaged, the size of the opening 4b is such that a major radial displacement is limited by the shaft 3 being intercepted by the edge of this opening 4b, thus protecting the spring and the other parts from being exposed to overloading. It would be quite feasible to provide the shaft 3 with a collar for also limiting axial displacement into the cup-shaped bearing box.

The bearing illustrated can be produced in the form of a self-contained assembly adapted to be inserted with the press fit into a suitable opening, radial pressure caused by a tight fit having no adverse effect because this is taken up by the bearing box 4 and not transmitted to the ball race 1.

Figure 2:
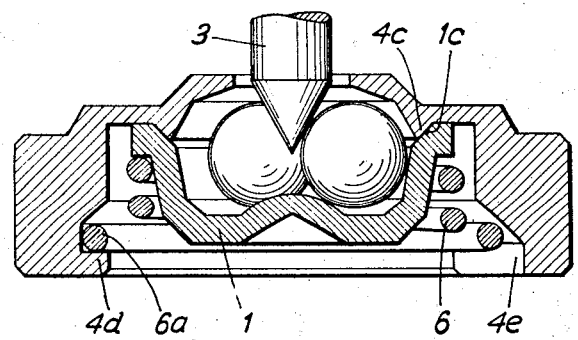
FIG. 2 is a transverse sectional view of another embodiment of the bearing.
Figure 3:
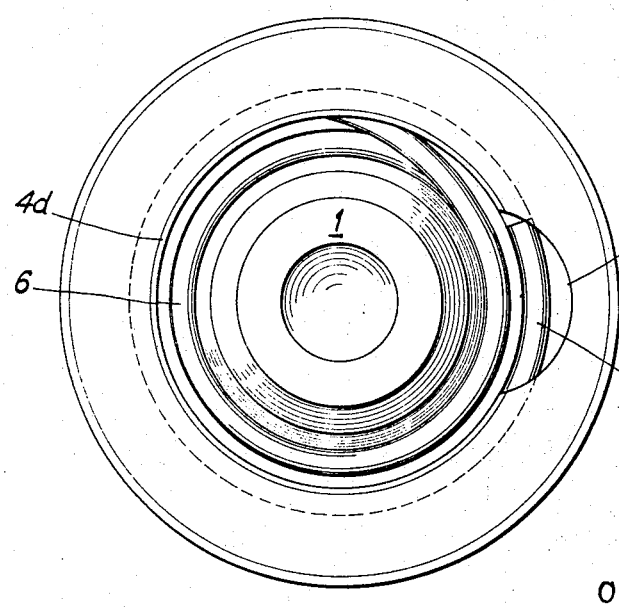
FIG. 3 is a bottom plan view of the bearing indicated in FIG. 2.

The bearing illustrated in FIGS. 2 and 3 differs from the bearing according to FIG. 1 substantially only in that the conical coil spring 5 is replaced by a spring 6 which is substantially cylindrical and so designed that nearly the entire last convolution 6a of the spring, i.e. the convolution bearing against the inside ledge 4d in the bearing box, has a slightly larger diameter and that the ledge has a recess 4e through which the end of the spring is accessible for removing the same from the bearing box in the event of the ball race or a ball requiring replacement. It will be understood from FIG. 1 that the end of the spring 5 used in the bearing in question is accessible because it is bent inwards and thus projects from the side of the ledge 4d inwards. In the bearing in FIGS. 2 and 3, the rating and loading of the spring 6 are naturally likewise so chosen that an axial thrust of the shaft will displace the ball race 1 axially and a radial thrust of the shaft will displace it radially, any radial displacement causing the ball race to tilt because the centering surface 1c cooperates with the centering rib 4c, only part of the circumference of the centering surface 1c being shifted in relation to the centering rib 4c in a direction towards the crest of the rib.

The bearing shown in FIG. 4 comprises a ball race 11 which may be of the same configuration as the ball race 1 in the bearing shown in FIGS. 2 and 3. However, the race could be of a slightly modified shape. The ball race 11 likewise carries three balls here identified by reference numeral 12, but it will be understood that a ball race containing four or more balls could likewise be provided. When shaft 13 is in rotation, these balls 12, as previously described, likewise roll in contact with a conical end 13a of the shaft 13 on the one hand, and with a rim 11a and a central projection 11b of the ball race on the other hand. The upper edge 11e of the ball race 11 is flat and bears against an annular inside face 14a of the "floor" of the cup-shaped bearing box 14, being urged into contact therewith by a dish spring 15 held in position by a retaining ring 14d which is a press fit in the bearing box 14. Naturally a ledge could be provided instead of the retaining ring 14d. The spring 15 is also of a rating and loading such that the ball race 11 will be displaced axially by an axial thrust of the shaft 13 and displaced radially by a radial thrust, the ball race being restored automatically by the thrust of the spring to the centered or normal position, which the race is shown occupying in FIG. 4, as soon as the shaft ceases to exert axial and radial pressure. Naturally the shaft 13 in this embodiment may likewise be formed with a collar for limiting axial displacement, the maximum radial displacement being determined by the size of an opening 14b in the floor of the bearing box 14.

Unlike the bearings illustrated in FIGS. 1 to 3 which can be designed to be so short in the axial direction that their height is even less than twice the diameter of one of the balls, a bearing of the kind illustrated in FIG. 4 can be designed to have a very small diameter, for example approximately four times the diameter of a ball, and have the form of a complete self-contained assembly adapted to be inserted with a tight fit into a bore without exposing the ball race to deformation by radial pressure generated when forcing the assembly into such a bore.

FIG. 5 illustrates a further bearing of which the bearing box has the form of a relatively elongated hollow cylinder 16 provided with an external screw thread 16a which permits the bearing box to be screwed into a mounting, such as an instrument casing or frame. At one end this bearing box has an opening 16b for entry of a pointed end 17a of a shaft 17. Concentrically surrounding this opening 16b on the inside of the bearing box is a bearing face 16c which cooperates with a flat edge 18a of the rim of a ball race 18. The ball race 18, which carries three balls 19, may be of exactly the same configuration as that illustrated in FIG. 1, or the ball race 11 illustrated in FIG. 4. The floor of the ball race 18 rests on a centering member 20 which has a centering cone 20a on the side facing the ball race, whereas the side facing away from the ball race has a bearing face for one end of a spring 21 which, at the end 21a remote from the centering member 20, rests in a recessed chamber 16d in the bearing box 16. The bearing box 16, which contains in its interior 16e the ball race 18, the centering member 20 and the spring 21, has a slot 16f at the end remote from the end provided with the opening 16b. This slot 16f permits the entire bearing box to be screwed into and out of a tapped hole with the aid of a screwdriver. Naturally the spring rating is so calculated and the centering cone 20a on the centering roll 20 so designed that the ball race 18 containing the balls 19 can yield axially to an axial thrust of the shaft 17 and radially to a radial thrust, the ball race being restored by the thrust of spring 21 and by the cooperation of the centering cone 20a on the centering roll 20 with the external surface of the central projection 18b of the ball race into its normal position which it is shown occupying in the drawing. It will be understood that for this purpose the centering member 20 is axially slidable inside the bore 16e with an accurate sliding fit substantially without clearance.

While specified embodiments of the invention have been shown and described in detail to illustrate the application of the inventive principles, it will be understood that the invention may be embodied otherwise without departing from such principles.

What is claimed is:

1. A bearing construction comprising a ball race of dish-shape configuration having a bottom with a central projection and an outer annular rim wall, at least three balls carried in said race between the projection and the outer rim wall, a bearing box surrounding said race having an end wall with an opening aligned substantially centrally with respect to said race for receiving a shaft therethrough for the support thereof between said three balls, said ball race having a flat bearing surface normally in contact with said bearing box and an oblique annular centering wall, and spring means biasing said race in the general direction of said balls and the shaft to be supported thereby, to urge said race into contact with said bearing box and including a part in contact with said annular centering wall permitting displacement of said race axially in the event of a predetermined axial thrust and radially in the event of a predetermined radial thrust, said spring means acting to restore said race in cooperation with said annular centering wall.

2. A bearing construction, according to claim 1, wherein said part in contact with said annular centering wall includes an annular centering rib formed on said bearing box in bearing engagement with the annular centering wall of said ball race.

3. A bearing construction, according to claim 1, wherein said part in contact with said annular centering wall includes a dish-shaped spring, said annular centering wall being formed on the outer surface of the bottom of said race.

4. A bearing construction, according to claim 1, wherein said race includes an outer wall with a flange portion defining a flat surface in bearing contact with said interior end wall of said bearing box, said bearing box having an annular rib formed on said end wall constituting said part in contact with said annular centering wall of said race, the interior side of said outer rim of said race including an oblique wall forming said annular centering wall in bearing contact with one side of said annular rib of said bearing box end wall.

5. A bearing construction, according to claim 4, wherein said spring comprises a conically formed coil spring, said bearing box having a ledge defined therein on a wall opposite from the wall having said opening on which said spring is supported, the smaller diameter portion of said spring bearing against the flange portion of said race member.

6. A bearing construction, according to claim 5, wherein said bearing box wall having said opening is a floor wall, the opposite wall thereof having a larger size opening, said spring having an end portion extending downwardly into said larger size opening.

7. A bearing construction, according to claim 1, wherein said spring is a cylindrical spring, a ledge formed on the interior of said bearing box member on which said spring is resting, said bearing box member having a central opening below said spring of smaller size than the spring diameter, and a recess defined through the ledge to permit access to said spring for removal through the opening.

8. A bearing construction, according to claim 1, wherein said bearing box member is an elongated member, said spring means including a coil spring, said member having an internal ledge holding the outer end of said spring, and a positioning member disposed between said spring and said bearing race, including a central projecting portion adapted to be positioned in engagement with the oblique annular centering wall of said race said oblique annular centering wall being defined on the lower exterior of said bearing race and said projecting portion of said positioning member constituting said part in contact with said annular centering wall of said race.

References Cited

UNITED STATES PATENTS 809,280    1/1906    Broomall _____ 308—159

MARTIN P. SCHWADRON, *Primary Examiner.*

FRANK SUSKO, *Examiner.*